US009227546B2

United States Patent
Marmur et al.

(10) Patent No.: US 9,227,546 B2
(45) Date of Patent: Jan. 5, 2016

(54) HOOK LIFT JIB APPARATUS

(71) Applicant: Omaha Standard, Inc., Trenton, NJ (US)

(72) Inventors: Lazar Marmur, Plainsboro, NJ (US); Kenneth E. Bailey, Jr., Vineland, NJ (US)

(73) Assignee: Omaha Standard, LLC, Council Bluffs, IA (US)

( * ) Notice: Subject to any disclaimer, the term of this patent is extended or adjusted under 35 U.S.C. 154(b) by 337 days.

(21) Appl. No.: 13/986,360

(22) Filed: Apr. 23, 2013

(65) Prior Publication Data

US 2013/0294874 A1 Nov. 7, 2013

Related U.S. Application Data

(60) Provisional application No. 61/687,796, filed on May 1, 2012.

(51) Int. Cl.
*B60P 1/48* (2006.01)
*B60P 1/64* (2006.01)

(52) U.S. Cl.
CPC *B60P 1/48* (2013.01); *B60P 1/6463* (2013.01)

(58) Field of Classification Search
CPC .......... B60P 1/48; B60P 1/5428; B60P 1/549; B60P 1/6418; B60P 1/6427; B60P 1/6463; B60P 1/6481; B60G 2206/122; B60G 17/005; B66C 1/68; F16F 9/56; F16F 1/3615; F16M 11/28

See application file for complete search history.

(56) References Cited

U.S. PATENT DOCUMENTS

| | | | |
|---|---|---|---|
| 2,552,178 A * | 5/1951 | Elmo | 33/203.2 |
| 3,103,356 A * | 9/1963 | Heines | 472/4 |
| 3,404,792 A | 10/1968 | Frieberg | |
| 3,819,075 A | 6/1974 | Derain | |
| 3,825,137 A | 7/1974 | Mackrill et al. | |
| 3,848,758 A | 11/1974 | Carter | |
| 3,874,537 A | 4/1975 | Kou | |
| 3,878,948 A | 4/1975 | Corompt | |
| 3,892,323 A | 7/1975 | Corompt | |
| 3,942,664 A | 3/1976 | Lemaire | |
| 3,964,625 A | 6/1976 | Wirz | |
| 3,984,013 A | 10/1976 | Wirz | |
| 3,987,918 A | 10/1976 | Corompt | |
| 3,988,035 A | 10/1976 | Corompt | |
| 4,009,791 A | 3/1977 | Derain | |
| 4,053,074 A | 10/1977 | Lemaire | |
| 4,073,396 A | 2/1978 | Derain | |
| 4,111,321 A | 9/1978 | Webster | |
| 4,147,266 A | 4/1979 | Corompt | |
| 4,175,904 A | 11/1979 | Airaksinen | |

(Continued)

Primary Examiner — Glenn Myers
(74) Attorney, Agent, or Firm — Hodgson Russ LLP

(57) ABSTRACT

An apparatus for a hook lift jib which is easily movable between an extended position and a retracted position to make the applications for use of this apparatus more universal since it is capable of being used for lifting and handling of refuse containers of various sizes. The jib member can be retained in the extended position by the placement of two locking pins extending therethrough or it can be capable of floating or automated self movement between the extended and retracted position responsive to removal of one of the pin members. The hook lift jib apparatus is designed to be particularly useful handling containers of different sizes particularly useful with containers wherein the container grip bar is between 54 inches and 61 inches from the adjacent ground surface.

3 Claims, 8 Drawing Sheets

(56) References Cited

U.S. PATENT DOCUMENTS

| | | | |
|---|---|---|---|
| 4,204,793 | A | 5/1980 | Lemaire |
| 4,225,281 | A | 9/1980 | Bibeau et al. |
| 4,265,463 | A | 5/1981 | Perruso |
| 4,290,726 | A | 9/1981 | Sutela et al. |
| 4,341,500 | A | 7/1982 | Laitinen |
| 4,344,731 | A | 8/1982 | Visa et al. |
| 4,350,469 | A | 9/1982 | Corompt |
| 4,453,878 | A | 6/1984 | Paukku |
| 4,470,747 | A | 9/1984 | Tichenor |
| 4,548,541 | A | 10/1985 | Corompt |
| 4,589,671 | A | 5/1986 | Boughton |
| 4,755,097 | A | 7/1988 | Corompt |
| 4,755,098 | A | 7/1988 | Wulf et al. |
| 4,802,811 | A | 2/1989 | Nijenhuis |
| 4,848,619 | A | 7/1989 | Corompt |
| 4,854,807 | A | 8/1989 | Bishop |
| 4,911,318 | A | 3/1990 | Bishop |
| 4,915,567 | A | 4/1990 | Ellingsen |
| 4,951,999 | A | 8/1990 | Rudolph et al. |
| 4,993,911 | A | 2/1991 | Grant |
| 5,007,792 | A | 4/1991 | Wiedeck et al. |
| 5,044,861 | A | 9/1991 | Kirchhoff et al. |
| 5,102,284 | A | 4/1992 | Raisio |
| 5,108,247 | A | 4/1992 | Viaanderen |
| 5,110,251 | A | 5/1992 | Gray |
| 5,163,800 | A | 11/1992 | Raisio |
| 5,186,598 | A * | 2/1993 | Lambert et al. ............... 414/498 |
| 5,203,668 | A | 4/1993 | Marmur |
| 5,213,466 | A | 5/1993 | Bubik |
| 5,290,138 | A | 3/1994 | Smart et al. |
| 5,531,559 | A | 7/1996 | Kruzick |
| 5,542,807 | A | 8/1996 | Kruzick |
| 5,542,808 | A | 8/1996 | Chiron et al. |
| 5,597,281 | A | 1/1997 | Croiset et al. |
| 5,601,393 | A | 2/1997 | Waldschmitt |
| 5,678,978 | A | 10/1997 | Markham |
| 5,743,700 | A | 4/1998 | Wood, Jr. et al. |
| 5,803,699 | A | 9/1998 | Pinkston |
| 5,931,321 | A | 8/1999 | Grant |
| 5,967,735 | A | 10/1999 | Smart et al. |
| 5,984,614 | A | 11/1999 | Weber |
| 6,092,863 | A | 7/2000 | Hagenbuch et al. |
| 6,158,947 | A | 12/2000 | Goiran et al. |
| 6,206,476 | B1 | 3/2001 | Welton |
| 6,332,746 | B1 | 12/2001 | Lang et al. |
| 6,406,247 | B1 | 6/2002 | Ghiretti et al. |
| 6,413,036 | B2 | 7/2002 | Welton |
| 6,457,931 | B1 | 10/2002 | Chapman |
| 6,547,506 | B1 | 4/2003 | Jacob |
| 6,558,104 | B1 | 5/2003 | Viaanderen et al. |
| 6,669,433 | B1 | 12/2003 | Kock |
| 6,705,823 | B2 | 3/2004 | Bohata |
| 6,712,578 | B2 | 3/2004 | Chabanas et al. |
| 6,726,431 | B2 | 4/2004 | Morrell |
| 6,749,389 | B1 | 6/2004 | Viaanderen |
| 6,761,524 | B2 | 7/2004 | Chabanas et al. |
| 6,802,686 | B1 | 10/2004 | Hastings |
| 7,100,500 | B2 | 9/2006 | Soler |
| 7,192,239 | B2 | 3/2007 | Marmur et al. |
| 7,214,028 | B2 | 5/2007 | Boasso et al. |
| 7,278,816 | B2 | 10/2007 | Marmur et al. |
| 7,290,974 | B1 | 11/2007 | Baker et al. |
| 7,300,239 | B2 | 11/2007 | Benedikt |
| 7,568,881 | B1 | 8/2009 | Collins |
| 7,572,091 | B1 | 8/2009 | Collins |
| 7,726,930 | B2 | 6/2010 | Simpson et al. |
| 7,866,934 | B2 | 1/2011 | Osburn et al. |
| 7,878,750 | B2 | 2/2011 | Zhou et al. |
| 7,967,544 | B2 | 6/2011 | Hall |
| 8,021,096 | B2 | 9/2011 | Railsback |
| 8,029,228 | B2 | 10/2011 | Marmur |
| 8,043,043 | B2 | 10/2011 | Collins |
| 8,061,955 | B2 | 11/2011 | McIntosh |
| 2004/0156701 | A1 | 8/2004 | Scranton et al. |
| 2005/0111948 | A1 | 5/2005 | Nolasco et al. |
| 2005/0281651 | A1 | 12/2005 | Simpson et al. |
| 2010/0303594 | A1 * | 12/2010 | Duell et al. ................... 414/479 |

* cited by examiner

HOOK LIFT JIB APPARATUS

The present utility application hereby formally claims priority of U.S. Provisional Patent application No. 61/687,796 filed May 1, 2012 on "HOOK LIFT JIB APPARATUS" filed by the same inventors listed herein, namely, Lazar Marmur and Kenneth E. Bailey Jr, and assigned to the same assignee, namely, Omaha Standard Inc., and said referenced provisional application is hereby formally incorporated by reference as an integral part of the present application.

BACKGROUND OF THE INVENTION

1. Field of the Invention

The present invention deals with the field of vehicles designed for the purpose of transporting containers such as refuse containers which includes a hook lift jib apparatus along with a powered cylinder member for the purpose of placement and removal of such a container relative to a position of rest upon the rear of the vehicle such as a transport truck or the like. Many prior art devices have been designed for this purpose but the present invention offers a uniquely universal construction because it is can be used for handling and transporting containers of various sizes and configurations while maintaining the same hook lift jib apparatus and the same powering system.

2. Description of the Prior Art

There are many patents which disclose various constructions for the configuration of the jib of a hook-lift vehicle apparatus such as shown in U.S. Pat. No. 3,404,792 patented Oct. 8, 1968 to B. O. Frieberg and assigned to Hiab Hydraulics Corporation on a "Material Handling Device"; and U.S. Pat. No. 3,819,075 patented Jun. 25, 1974 to C. Derain and assigned to Societe Nouvelle des Bennes Saphen on a "Device For Loading A Skip On To A Vehicle"; and U.S. Pat. No. 3,825,137 patented Jul. 23, 1974 to D. Kackrill et al and assigned to Sheppard Equipment Limited on a "Vehicle For Transporting A Container"; and U.S. Pat. No. 3,848,758 patented Nov. 19, 1974 to J. N. Carter on an "Hydraulic Truck Bed"; and U.S. Pat. No. 3,874,537 patented Apr. 1, 1975 to J. Kou on a "Road Vehicle Of The Platform Type"; and U.S. Pat. No. 3,878,948 patented Apr. 22, 1975 to Antoine Corompt and assigned to Bennes Marrel on a "Self-Contained Device For Handling Containers On A Lorry"; and U.S. Pat. No. 3,892,323 patented Jul. 1, 1975 to A. Corompt and assigned to Bennes Marrel on a "Container-Handling Device For A Self-Loading Vehicle"; and U.S. Pat. No. 3,942,664 patented Mar. 9, 1976 to P. Lemaire on a "Device For Handling A Load Bucket Removably Mountable On A Vehicle"; and U.S. Pat. No. 3,964,625 patented Jun. 22, 1976 to H. A. Wirz and assigned to Ernst Wirz A G, Kipper- & Maschinenfabrik on an "Apparatus Provided At A Vehicle For Tilting And Loading And Unloading A Receptacle By A Rolling Action"; and U.S. Pat. No. 3,984,013 patented Oct. 5, 1976 to H. Wirz on a "Roll-On Mechanism For Loading A Container Onto A Vehicle"; and U.S. Pat. No. 3,987,918 patented Oct. 26, 1976 to A. Corompt on a "Device For Loading Or Unloading Boxes Or Removable Buckets, In Particular For Lorries"; and U.S. Pat. No. 3,988,035 patented Oct. 26, 1976 to A. Corompt and assigned to Bennes Marrel on a "Locking Device, In Particular For A Handling Cranked Arm Mounted On A Vehicle"; and U.S. Pat. No. 4,009,791 patented Mar. 1, 1977 to C. Derain and assigned to Societe Nouvelle des Bennes Saphem on a "Truck Dump-Body Operating Mechanism"; and U.S. Pat. No. 4,053,074 patented Oct. 11, 1977 to P. Lemaire on a "Device For Handling A Vehicle-Carried Container"; and U.S. Pat. No. 4,073,396 patented Feb. 14, 1978 to C. Derain and assigned to Societe Nouvelle des Bennes Saphem on a "Movable Container Adjustable In Height, For Loading On A Vehicle"; and U.S. Pat. No. 4,111,321 patented Sep. 5, 1978 to R. G. Webster and assigned to Edbro Limited on a "Mechanisms For Loading And Unloading Containers Onto And From A Vehicle"; and U.S. Pat. No. 4,147,266 patented Apr. 3, 1979 to A. Corompt and assigned to Bennes Marrel on a "Semi-Trailer For Handling And Transporting Standardized Containers"; and U.S. Pat. No. 4,175,904 patented Nov. 27, 1979 to M. Airaksinen and assigned to Multilift Oy on an "Apparatus For Mounting, Demounting, and Tipping Vehicles"; and U.S. Pat. No. 4,204,793 patented May 27, 1980 to P. H. Lemaire on a "Device For Handling Containers"; and U.S. Pat. No. 4,225,281 patented Sep. 30, 1980 to J. M. Bibeau et al on a "Self-Loading Container Carrier Truck"; and U.S. Pat. No. 4,265,463 patented May 5, 1981 to R. S. Perruso on a "Combination Vehicle For Towing, Dumping And The Like"; and U.S. Pat. No. 4,290,726 patented Sep. 22, 1981 to L. Sutela et al and assigned to Oy Partek A B on "Equipment For Loading Of An Exchange Platform Or Container"; and U.S. Pat. No. 4,341,500 patented Jul. 27, 1982 to H. Laitinen and assigned to Oy Partek Ab on "Loading Equipment"; and U.S. Pat. No. 4,344,731 patented Aug. 17, 1982 to H. Visa et al and assigned to Oy Partek A B on "Equipment For Raising An Exchange Platform Or Container To A Horizontal Position Above The Level Of The Transport Position"; and U.S. Pat. No. 4,350,469 patented Sep. 21, 1982 to A. Corompt and assigned to Bennes Marrel S. A. on a "Handling Device Mounted On A Vehicle To Carry Out The Handling Of Loads Such As Skips And Containers"; and U.S. Pat. No. 4,453,878 patented Jun. 12, 1984 to T. Paukku and assigned to O Y Partek A B on a "Lock Device For Loading Equipment"; and U.S. Pat. No. 4,470,747 patented Sep. 11, 1984 to R. L. Tichenor and assigned to Recycling & Conservation, Inc. on "Separated Discards Carrier With Safety Features"; and U.S. Pat. No. 4,548,541 patented Oct. 22, 1985 to A. Corompt and assigned to Bennes Marrel on a "Method And Apparatus For Unloading A Piece Of Equipment Placed On A Carrying Vehicle"; and U.S. Pat. No. 4,589,671 patented May 20, 1986 to T. T. Boughton and assigned to T. T. Boughton & Sons Ltd. on "Load Carrying Road Vehicles"; and U.S. Pat. No. 4,755, 097 patented Jul. 5, 1988 to A. Corompt and assigned to Bennes Marrel on a "Device For The Handling And Transfer Of A Load On A Vehicle Such As A Container Or A Tray"; and U.S. Pat. No. 4,755,098 patented Jul. 5, 1988 to P. Wulf et al and assigned to Oy Partek Ab on "Equipment For Loading A Cargo Space Onto A Vehicle And For Removing The Cargo Space Off The Vehicle"; and U.S. Pat. No. 4,802,811 patented Feb. 7, 1989 to D. Nijenhuis and assigned to N.C.H. Hydraulische Systemen BV on an "Apparatus For Loading And Unloading An Interchangeable Container Onto And From A Vehicle"; and U.S. Pat. No. 4,848,619 patented Jul. 18, 1989 to A. Corompt and assigned to Bennes Marrel on a "Device For The Handling Of A Container"; and U.S. Pat. No. 4,854,807 patented Aug. 8, 1989 to F. W. Bishop and assigned to George Blair Public Limited Company on a "Freight Container Lifting Means"; and U.S. Pat. No. 4,911,318 patented Mar. 27, 1990 to F. W. Bishop and assigned to American Coastal industries on an "Air Transportable Container Adjunct"; and U.S. Pat. No. 4,915,567 patented Apr. 10, 1990 to S. Ellingsen and assigned to Paccar Inc. on a "Flatrack Loading System And Method For Palletized Loading System"; and U.S. Pat. No. 4,951,999 patented Aug. 28, 1990 to R. Rudolph et al and assigned to PM Equipment Sales, inc. on a "High Lift Dump Truck"; and U.S. Pat. No. 4,993,911 patented Feb. 19, 1991 to R. K. Grant and assigned to Grant Wrecker Equipment, Inc. on a "Mobile Crane"; and U.S. Pat.

No. 5,007,792 patented Apr. 16, 1991 to H. Wiedeck et al on a "Vehicle-Mounted Load Hoisting Device"; and U.S. Pat. No. 5,044,861 patented Sep. 3, 1991 kto J. Kirchhoff et al and assigned to Edelhoff Polytechnik GmbH & Co. on a "Garbage-Collecting Truck Having A Replaceable Container Which Is Recirprocably Mounted On A Tillable Frame"; and U.S. Pat. No. 5,102,284 patented Apr. 7, 1992 to R. Raisio and assigned to Multilift Oy on a "Method And Equipment For The Transfer Of A Cargo Space Onto A Vehicle And Off The Vehicle"; and U.S. Pat. No. 5,108,247 patented Apr. 28, 1992 to J. Visanderen and assigned to Stellar Industries on a "Loading Linkage"; and U.S. Pat. No. 5,110,251 patented May 5, 1992 to R. E. Gray on an "Hydraulic Platform Lift For Truck Trailers"; and U.S. Pat. No. 5,163,800 patented Nov. 17, 1992 to R. Raisio and assigned to Multilift Oy on a "Transportable Frame And Equipment Frame For Use With Load Handling System"; and U.S. Pat. No. 5,203,668 patented Apr. 20, 1993 to L. Marmur and assigned to E. Fisher; L. Marmur, F. Fisher and W. Kimble on an "Apparatus For Loading And Unloading Of A Container Structure Or Other Loads With Respect To A Truck Body Or Trailer"; and U.S. Pat. No. 5,213,466 patented May 25, 1993 to L. Bubik and assigned to Vulcan International, Inc. on a "Multifunction Loading And Recovery Apparatus"; and U.S. Pat. No. 5,290,138 patented Mar. 1, 1994 to L. Smart et al and assigned to American Hook Lift, Inc. on a "Loading And Recovery Apparatus With Self-Locking L-Arm"; and U.S. Pat. No. 5,531,559 patented Jul. 2, 1996 to K. Kruzick and assigned to Galbreath, Inc. on a "Vehicle Mounted Hook Hoist For Loading, Transporting And Dumping Containers"; and U.S. Pat. No. 5,542,807 patented Aug. 6, 1996 to K. Kruzick and assigned to Galbreath Incorporated on a "Vehicle Mounted, Variable Length Hook Hoist"; and U.S. Pat. No. 5,542,808 patented Aug. 6, 1996 to A. Chiron et al and assigned to Marrel on an "Apparatus On A Vehicle To Pick Up A Load"; and U.S. Pat. No. 5,597,281 patented Jan. 28, 1997 to C. Croiset et al and assigned to Marrel Societe Anonyme on a "Device For Handling Loads From A Vehicle"; and U.S. Pat. No. 5,601,393 patented Feb. 11, 1997 to T. J. Waldschmitt and assigned to Swaokinder U.S.A., Ltd. on a "Dual Capacity Hook-Lift Hoist"; and U.S. Pat. No. 5,678,978 patented Oct. 21, 1997 to G. R. Markham and assigned to Moder, Inc. on an "Apparatus For A Tillable Rolloff Trailer Having A Displacable Frame"; and U.S. Pat. No. 5,743,700 patented Apr. 28, 1998 to R. A. Wood, Jr. et al and assigned to John Donovan Enterprises—FL., Inc. on a "Container Covering System"; and U.S. Pat. No. 5,803,699 patented Sep. 8, 1998 to D. L. Pinkston and assigned to Capitol Tool and Die Co. on an "Apparatus And Method For Loading And Unloading Containers"; and U.S. Pat. No. 5,931,321 patented Aug. 3, 1999 to R. K. Grant on a "Crane Mechanism"; and U.S. Pat. No. 5,967,735 patented Oct. 19, 1999 to L. Smart et al and assigned to Krause Plow Corporation on a "Loading And Recovery Apparatus"; and U.S. Pat. No. 5,984,614 patented to R. W. Weber on Nov. 16, 1999 on an "Apparatus For Retrieving And Transporting Disabled Vehicles"; and U.S. Pat. No. 6,092,863 patented Jul. 25, 2000 to L. G. Hagenbuch et al and assigned to Philippi-Hagenbuch, Inc. on an "Assembly For Automatically Opening The Tailgate Of A Container"; and U.S. Pat. No. 6,158,947 patented Dec. 12, 2000 to T. Goiran et al and assigned to Marrel on a "Device And Method For Loading And Unloading Containers"; and U.S. Pat. No. 6,206,476 patented Mar. 27, 2001 to R. J. Welton and assigned to TXI Operations, LP on a "Waste Concrete Container"; and U.S. Pat. No. 6,332,746 patented Dec. 25, 2001 to A. M. Lang et al and assigned to Delaware Capital Formation, Inc. on a "Locking Mechanism For Roll-Off Hoist"; and U.S. Pat. No. 6,406,247 patented Jun. 18, 2002 to A. Ghiretti et al and assigned to Palfinger A G on an "Apparatus For Loading And Unloading A Container On To And Off A Vehicle"; and U.S. Pat. No. 6,413,036 patented Jul. 2, 2002 to R. J. Welton and assigned to TXI Operations, LP on a "Waste Concrete Container"; and U.S. Pat. No. 6,457,931 patented Oct. 1, 2002 to G. Chapman on a "Truck Mounted Hoist"; and U.S. Pat. No. 6,547,506 patented Apr. 15, 2003 to A. K. Jacob on a "Multi-Task Truck"; and U.S. Pat. No. 6,558,104 patented May 6, 2003 to J. A. Vlaanderen et al and assigned to Stellar Industries, Inc. on a "Container Handling System For A Vehicle"; and U.S. Pat. No. 6,669,433 patented Dec. 30, 2003 to H. DeKock on a "Device For Handling Containers For Road Transport"; and U.S. Pat. No. 6,705,823 patented Mar. 16, 2004 to J. F. Bohata on a "Vehicle For Lifting And Transporting Containers"; and U.S. Pat. No. 6,712,578 patented Mar. 30, 2004 to N. Chabanas et al and assigned to Marrel on "Loadhandling Equipment, A Vehicle Incorporating The Equipment And A Method of Raising A Load With The Equipment"; and U.S. Pat. No. 6,726,431 patented Apr. 27, 2004 to J. C. Morrell on a "Container Handling System And Method"; and U.S. Pat. No. 6,749,389 patented Jun. 15, 2004 to J. Vlaanderen and assigned to Stellar Industries, Inc. on a "Linkage For On-Off Loading And Dumping Of A Dumpster On A Truck Frame"; and U.S. Pat. No. 6,761,524 patented Jul. 13, 2004 to N. Chabanas and assigned to Marrel on a "Loadhandling Equipment And Vehicle Incorporating It"; and U.S. Pat. No. 6,802,686 patented Oct. 12, 2004 to T. Hastings on a "Tip-Up Trailer And Method For Loading The Same"; and U.S. Pat. No. 7,100,500 patented Sep. 5, 2006 to R. Soler and assigned to J S B Constructions on a "Device For Compacting Waste In Containers"; and U.S. Pat. No. 7,192,239 patented Mar. 20, 2007 to L. Marmur et al and assigned to Automated Waste Equipment Co., Inc. on an "Apparatus For Dual Stage Loading Of A Container Upon A Roll-Off Vehicle"; and U.S. Pat. No. 7,214,028 patented May 8, 2007 to W. J. Boasso and assigned to Boasso America Corporation on a "Method And Apparatus For Supplying Bulk Product To An End User"; and U.S. Pat. No. 7,278,816 patented Oct. 9, 2007 to L. Marmur et al and assigned to Automated Waste Equipment Co., Inc. on a "Locking Mechanism For A Double Articulating Hook Lift Apparatus Usable Mounted On A Vehicle"; and U.S. Pat. No. 7,290,974 patented Nov. 6, 2007 to G. E. Baker et al on a "Mountable Hitch"; and U.S. Pat. No. 7,300,239 patented Nov. 27, 2007 to W. A. Benedikt on a "Hoist For Loading And Unloading Objects On A Truck Bed"; and U.S. Pat. No. 7,568,881 patented Aug. 4, 2009 to V. L. Collins and assigned to M & D RP, LLC on a "System And Method For Loading/ Unloading Containers"; and U.S. Pat. No. 7,572,091 patented Aug. 11, 2009 to V. L. Collins and assigned to M & D RP LLC on a "System For Loading/Unloading Containers"; and U.S. Pat. No. 7,726,930 patented Jun. 1, 2010 to D. Simpson et al and assigned to Swaploader U.S.A., Ltd. on an "Adjustable Height Jib For A Hook-Lift Hoist"; and U.S. Pat. No. 7,731, 855 patented Jun. 8, 2010 to N. J. Dunbar et al and assigned to Samaran International Pty Ltd. on "Septic Tanks"; and U.S. Pat. No. 7,866,934 patented Jan. 11, 2011 to D. H. Osburn et al and assigned to Petersen Industries, Inc. on an "Apparatus And Method for Removably Attaching A Loading Device To A Vehicle"; and U.S. Pat. No. 7,878,750 patented Feb. 1, 2011 to Z. Zhou et al and assigned to Oshkosh Corporation on a "Rotatable And Articulated Material Handling Apparatus"; and U.S. Pat. No. 7,967,544 patented to A. Hall on Jun. 28, 2011 on "Load Carrying Vehicles"; and U.S. Pat. No. 8,021, 0096 patented Sep. 20, 2011 to D. Railsback on a "Truck Bed"; and U.S. Pat. No. 8,029,228 patented Oct. 4, 2011 to L. Marmur and assigned to Omaha Standard, Inc. on a "Cable Hoisting Apparatus"; and U.S. Pat. No. 8,043,043 patented Oct. 25, 2011 to V. L. Collins and assigned to The Heil Co. on a "System And Method For Loading/Unloading Containers"; and U.S. Pat. No. 8,061,955 patented Nov. 22, 2011 to D. McIntosh on a "Waste Container Carrier"; and U.S. Publication No. 2004/0156701 and published on Aug. 12, 2004 to T. L. Scranton et al on an "Apparatus For Transferring Containers And Flat Racks From A Truck To A Trailer"; and U.S. Publication No. 2005/0111948 and published on May 26, 2005 to P. Nolasco et al on an "Integrated. Boom, Tow Bar And Wheel Lift Tow Truck Assembly"; and U.S. Publication No. 2005/0281651 and published on Dec. 22, 2005 to D. Simpson et al on a "Hook Lift Hoist Adaptable For Use With Containers Or Variable Length".

SUMMARY OF THE INVENTION

The present invention provides a unique hook lift jib apparatus powered by an extensible member and usable to facilitate handling of containers of various sizes and configurations. The apparatus includes an inner frame leg which is connected preferably to the extensible member for being movably powered therefrom. An outer frame leg is attached to the inner frame leg for movement therewith. The outer frame leg defines an outer tubular section which defines a jib retaining channel means channel therein. The outer tubular section of the outer frame leg further defines a jib receiving opening therein. The jib retaining channel and the jib receiving opening are in full fluid flow communication with respect to one another.

The outer frame leg defines an outer pin aperture extending therethrough into the jib retaining channel defined therein. The outer frame leg also defines an inner pin aperture extending therethrough into the jib retaining channel defined therein in a location spatially disposed from the location outer pin aperture.

The jib member of the present invention is constructed including an outer jib section defining a jib hook thereon which is adapted to engage a container to facilitate movement thereof. An inner jib section is included attached to the outer jib section at a position thereon spatially disposed from the jib hook. The inner jib section is slidably movably positionable extending through the jib receiving opening into the jib retaining channel to facilitate axial movement thereof relative to the jib retaining channel. In this manner, the jib hook will be moving similarly along therewith at a position outside of the jib retaining channel.

The jib member is movable between an extended position with the jib hook positioned spatially disposed distant from the jib receiving opening, and a retracted position with the jib member being positioned spatially closer to the jib receiving opening than when located in the extended position. The inner jib section also defines a slot extending therethrough which is registrable with respect to the outer pin aperture and the inner pin aperture responsive to positioning of the jib member in the extended position. The inner pin member is positioned extending through the inner pin aperture and into the jib retaining channel and into the slot means defined in the inner jib section. An outer pin member is selectively positionable extending through the outer pin aperture and into the jib retaining channel and into the slot defined in the inner jib section at a location spatially disposed from the inner pin member for the purpose of selectively retaining the jib member in the extended position. This jib member is capable of movement between the extended position to the retracted position responsive to movement of the outer pin member from the slot.

It is an object of the hook lift jib apparatus of the present invention to be usable for handling including both lifting and removal of containers of various sizes and configurations relative to a vehicle usable for transporting thereof.

It is an object of the hook lift jib apparatus of the present invention to facilitate handling of containers wherein the container grip bar is positioned generally between approximately 54 inches and approximately 61 inches from the surrounding ground area.

It is an object of the hook lift jib apparatus of the present invention to be fully operational in an automatically.

It is an object of the hook lift jib apparatus of the present invention to require a minimum number of movable parts.

It is an object of the hook lift jib apparatus of the present invention to have minimal maintenance requirements.

It is an object of the hook lift jib apparatus of the present invention to provide a means for handling various sized and configured containers while utilizing the same powering longitudinally extensible drive cylinder made positive by slight variations in positioning of the jib relative to the drive cylinder.

It is an object of the hook lift jib apparatus of the present invention which can be adapted for use with different sizes and configurations of conventional containers merely by the placement or removal of a single locking pin member thereinto.

It is an object of the hook lift jib apparatus of the present invention to provide a jib member which is movably positionable within a jib retaining channel to more than one position in an automatic manner responsive to powered movement of the jib apparatus by a drive cylinder connected thereto and pivotally mounted to the vehicle.

BRIEF DESCRIPTION OF THE DRAWINGS

While the invention is particularly pointed out and distinctly described herein, a preferred embodiment is set forth in the following detailed description which may be best understood when read in connection with the accompanying drawings, in which.

DETAILED DESCRIPTION OF THE PREFERRED EMBODIMENT

Figure 1:
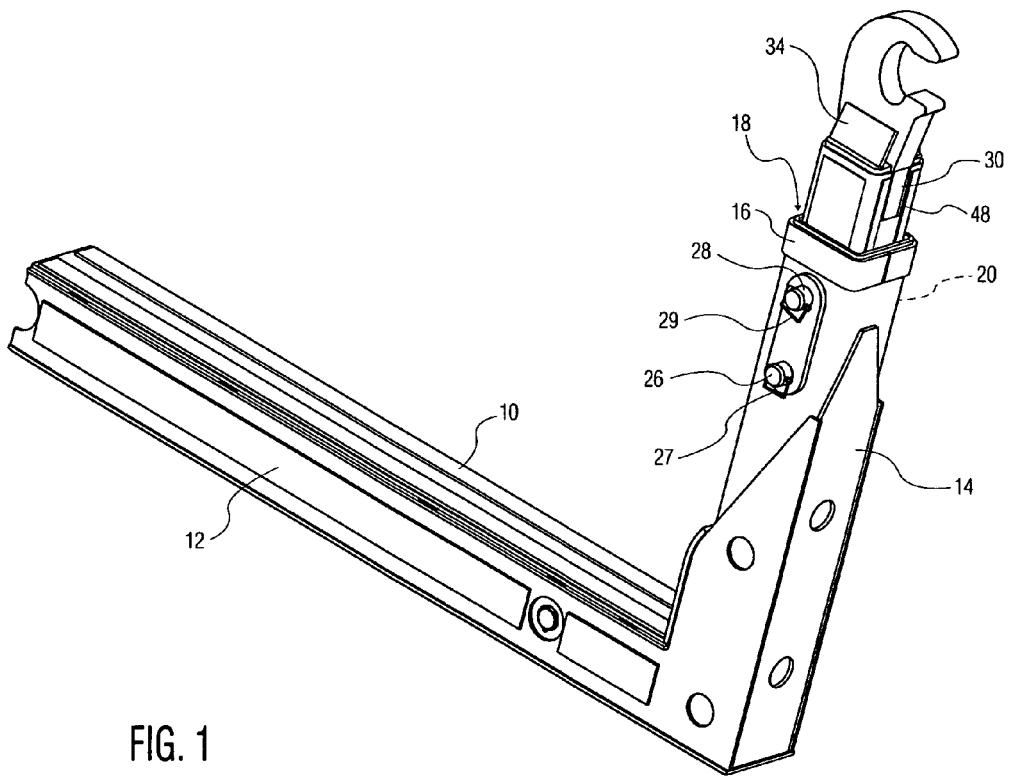
FIG. 1 is a front perspective view of a hook lift jib apparatus of the present invention showing the jib member in the extended position with both pins inserted.

The hook lift jib apparatus of the present invention includes a base frame 10 which is generally L-shaped and includes an inner frame leg 12 and an outer frame leg 14 which are oriented approximately perpendicularly with respect to one another. The hook lift jib apparatus is powered by an extensible member 60 and usable to facilitate handling of containers of various sizes and configurations.

The outer frame leg 14 defines an outer tubular section 16 which defines a jib receiving opening 18 in the end thereof to provide access to a longitudinally extending jib retaining channel means 20 extending thereinto. This jib retaining channel means 20 is of a configuration to receive the jib member 30 slidably engaged therewith and movable therealong. Jib member 30 preferably includes an inner jib section 32 and an outer jib section 34. The outer jib section 34 includes a jib hook 36 secured preferably to the outermost portion thereof which jib hook is designed to be positionable selectively in engagement with a conventional container grip bar 56 to facilitate lifting of the container 54 and handling thereof for placement upon a vehicle such as a truck 58 or removal therefrom. The inner jib section 32 of the jib member 30 defines the portion of jib member 30 which is adapted to be slideably mounted within the jib retaining channel 20. With the inner jib section 32 in the jib retaining channel means 20, the outer jib section 34 will extend outwardly therefrom and position the jib hook 36 at a position spatially disposed from the jib receiving opening 18 which is preferably positioned at the outermost portion of the jib retaining channel 20. It must be appreciated that the jib receiving opening 18 is in full fluid flow communication with respect to the jib retaining channel means 20 in order to facilitate access to movement of the inner jib section 32 of jib member 30 thereinto and therealong.

The outer tubular section 16 of the outer frame leg 14 of base frame 10 will preferably define an inner pin aperture means 22 and an outer pin aperture means 24 therein. The inner pin aperture means 22 will be positioned at a greater distance from the jib receiving opening 18 than the outer pin aperture means 24. As such, the outer pin aperture means 24 will be spatially disposed from the inner pin aperture means 22 at a location closer to the jib hook 36. The inner jib section 32 will preferably define a slot means 37 extending longitudinally therealong. The slot means 37 will be defined in the inner jib section 32 extending longitudinally with respect to the jib retaining channel means 20. Slot means 37 will include an inner slot end 38 and an outer slot end 39. The slot means 37 will be defined extending from the inner slot end 38 to the outer slot end 39.

The jib member 30 will be movable between an extended position 48 defined to be when the jib hook 36 at the farthest position possible relative to the jib receiving opening 18. Jib member 30 will also be movable to a retracted position 50 with the jib hook 36 being positioned closer to the jib receiving opening 18 than when the jib member 30 is positioned in the extended position 48.

When the jib member 30 is positioned in the fully extended position 48 the outer pin aperture means 24 will be in alignment and registration with the outer slot end 39 of slot means 37. Similarly the inner pin aperture means 22 will be in alignment and registration with the inner slot end 38 of slot means 37. In order to maintain the jib member 30 in this extended position an inner pin member 26 will be positionable extending into the inner pin aperture means 22 as well as extending further into the slot means 37 at the inner slot end 38 thereof. Similarly an outer pin member 28 is included capable of extending through the outer pin aperture means 24 and further inwardly into the slot means 37 at the outer slot end 39 thereof responsive to the jib member 30 being in the extended position 48. With both the inner pin member 26 and the outer pin member 28 in place the jib member 30 will be locked in the extended position 48. This is often referred to as the fixed configuration.

Figure 2:
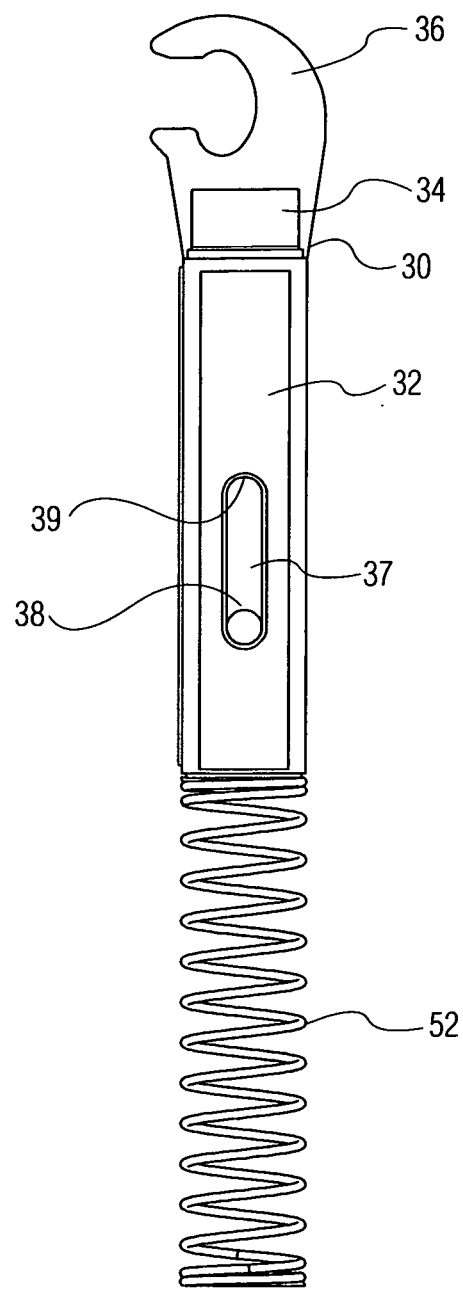
FIG. 2 is a front plan view of a jib member of the hook lift jib apparatus of the present invention for purposes of clarity thereof and shows the optional resilient biasing means possibly usable therewith.
Figure 3:
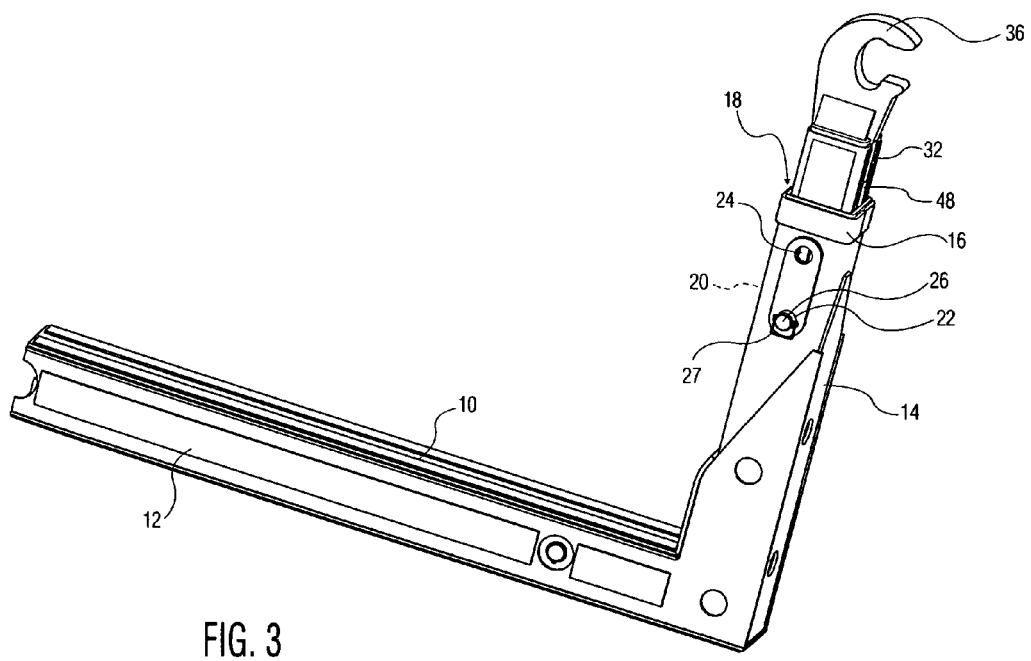
FIG. 3 is a front perspective view of a hook lift jib apparatus of the present invention showing the jib member in the extended position with the inner pin member inserted and the outer pin member removed.
Figure 4:
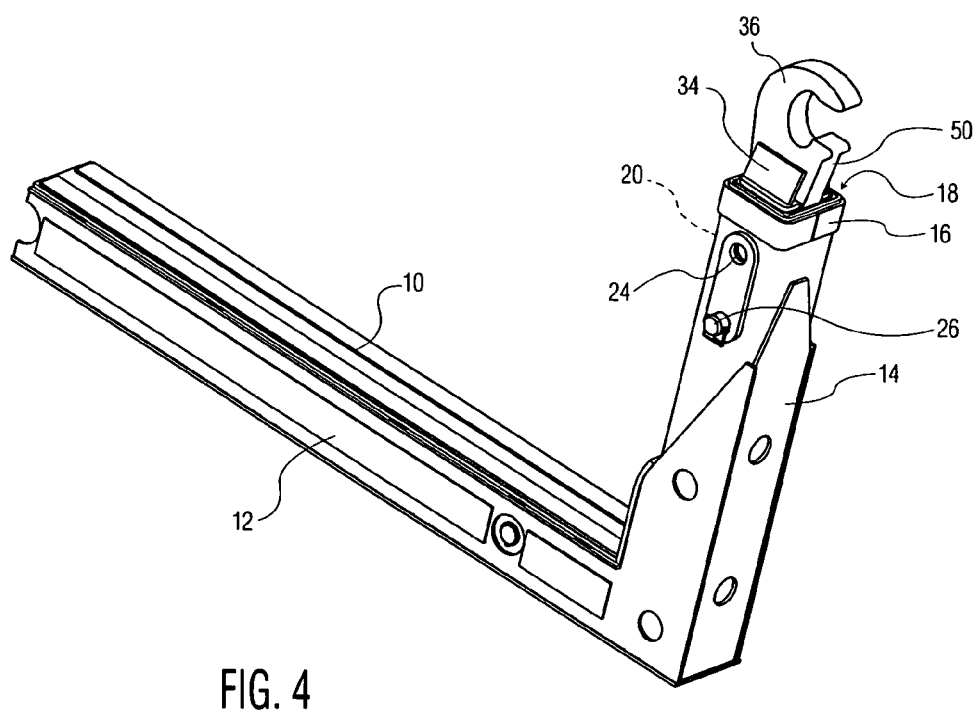
FIG. 4 is a front perspective view of a hook lift jib apparatus of the present invention showing the jib member in a retracted position with the inner pin member inserted and the outer pin member removed.
Figure 5:
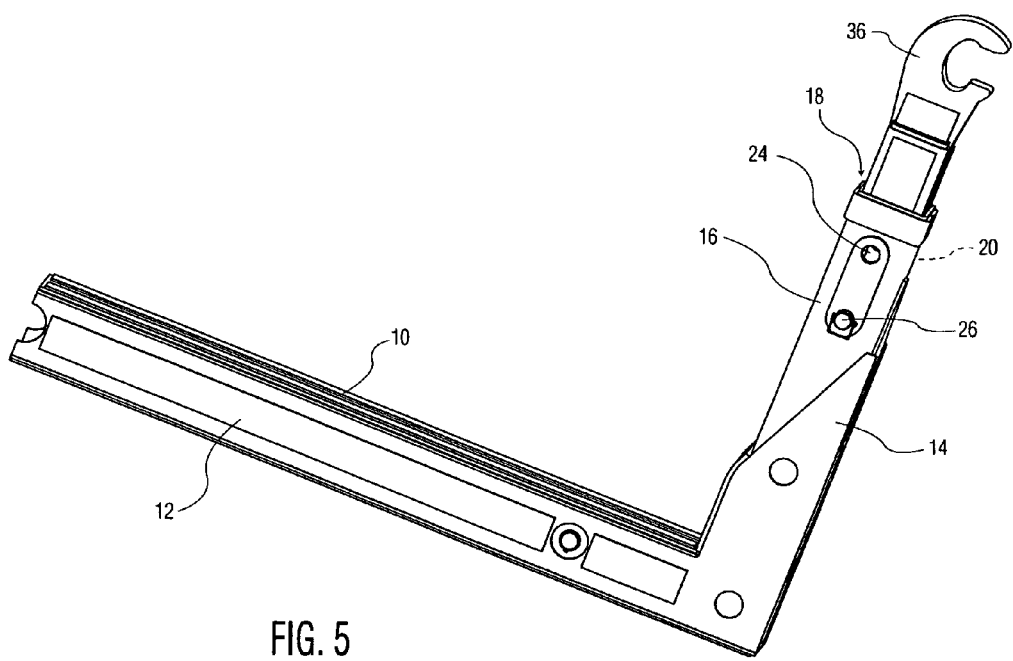
FIG. 5 is a front perspective view of a hook lift jib apparatus of the present invention with the inner pin member inserted and the outer pin member removed and showing a jib member positioned immediately after initiating movement thereof from the extended position toward the retracted position.
Figure 6:
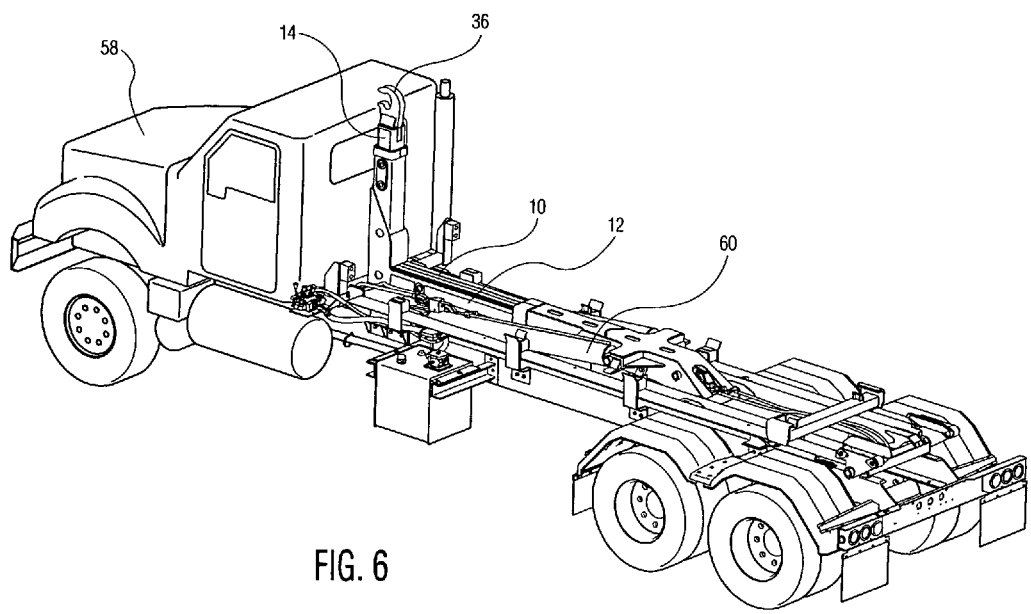
FIG. 6 is a perspective illustration of a vehicle shown from the rear without a container positioned therein showing the hook lift jib apparatus of the present invention positioned at the rest position thereon.
Figure 7:
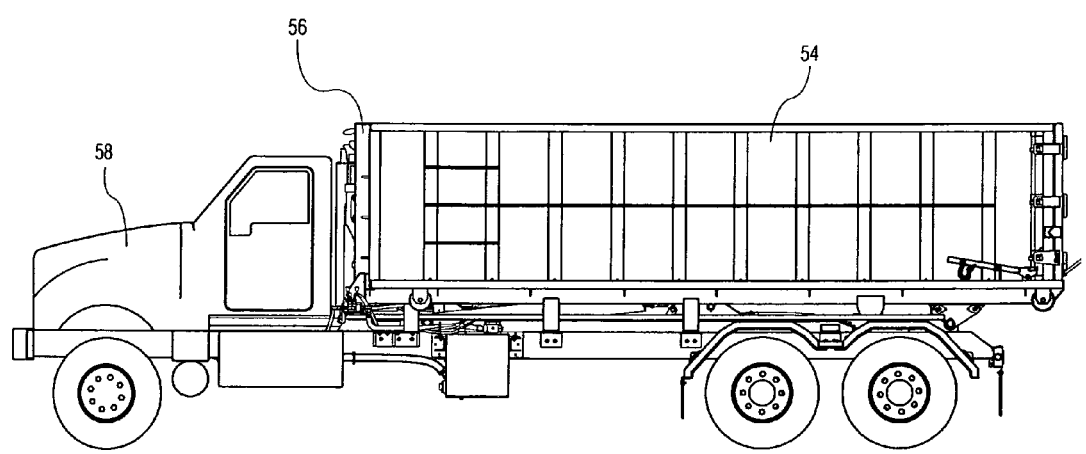
FIG. 7 is a side plan view of a vehicle with a container positioned finally resting and retained thereon with a hook lift jib apparatus of the present invention positioned at the resting hooked position in retaining engagement with the container ready for transport.
Figure 8:
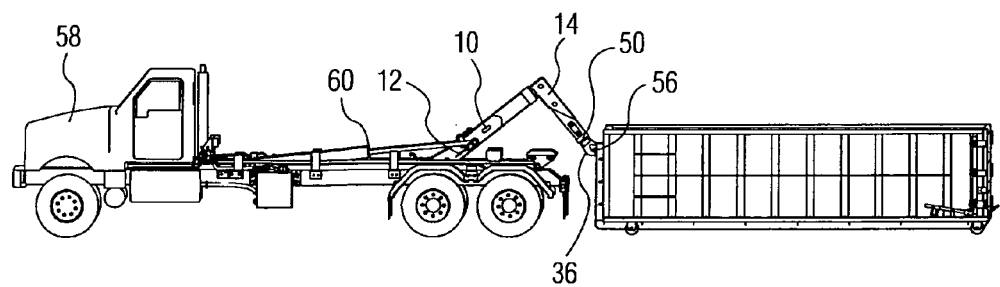
FIG. 8 is a side plan view of a vehicle with a hook lift jib apparatus of the present invention shown mounted thereon in the loading position attached to a 54 inch container with both pins inserted and the jib member pin in the extended position for use with a 54 inch container which shows the mechanical disadvantage when using a 54 inch fixed hook height jib to lead a 54 inch container.
Figure 9:
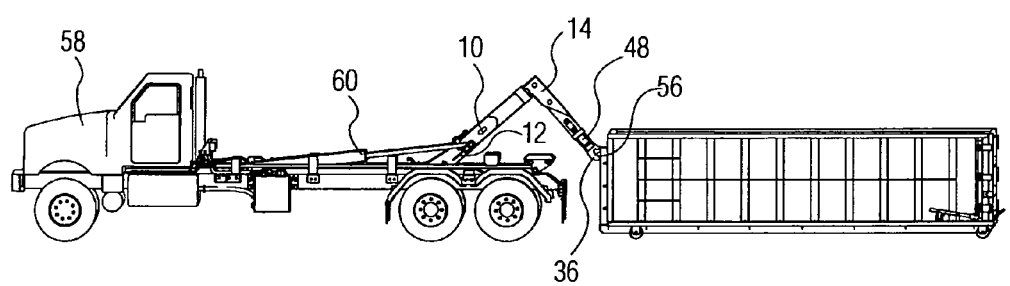
FIG. 9 is a side plan view of a vehicle with a hook lift jib apparatus of the present invention mounted thereon shown in the loading position attached to a 54 inch container with the outer pin removed to allow the jib member to float with the jib member shown positioned in the extended position.
Figure 10:
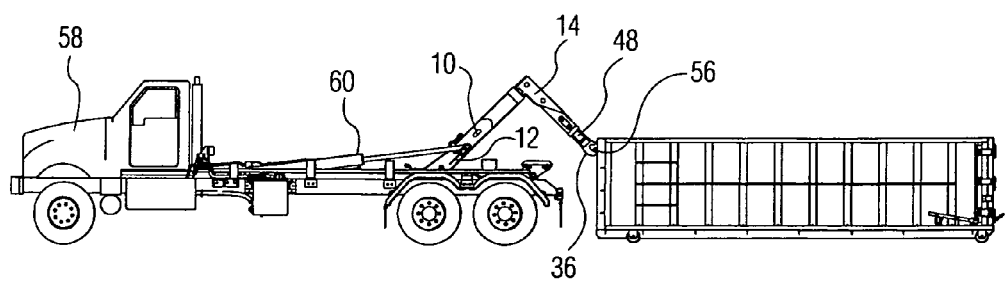
FIG. 10 is a side plan view of a truck vehicle shown with a hook lift jib apparatus of the present invention mounted thereon in the loading position attached to a 61 inch container with the outer pin removed and the jib member shown positioned in the extended position.

The jib member 30 can also be in a floating or unlocked configuration. This floating configuration is made possible by removal of the outer pin member 28 as shown best in FIGS. 4 and 5. FIG. 4 shows the hook lift jib apparatus of the present invention in the floating configuration but with the jib member still located in the retracted position 50. Movement of the jib member to the extended position 48 can be made possible by positioning of the base frame 18 in an inverted position such that the forces of gravity will cause the jib member 30 to move to the extended position 48. Alternatively, a biasing means such as a spring 52 as shown in FIG. 2, can be included to facilitate movement of the jib member 30 to the extended position 48 whenever the outer pin member 28 has been removed.

As such, this capability of movement of the jib member 30 between the extended position 48 and the retracted position 50 provides different mechanical advantages achieved through leverage which makes this apparatus usable for powering containers 54 of different sizes and, in particular, containers having grip bars 56 at distances of between 54 inches and 61 inches from the surrounding environmental ground area therebelow.

The resilient biasing means 52 can take any form as long as it resiliently biases the jib member toward the extended position at all times. However, in FIG. 2 it is shown as a coiled spring 52 which would be fairly common for this purpose.

Removal or replacement of the inner pin member 26 relative to the inner pin aperture means 22 and the outer pin aperture means 24 is not necessary to allow movement of the jib member between the retracted position and the extended position. Movement of the inner pin member 26 and the outer pin member 28 relative to the inner pin aperture means 22 and the outer pin aperture means 24 is important such as for maintenance or storage and sometimes requires a significant amount of force of extraction. For this purpose the inner pin member 22 can include an inner pin bracket member 27 such as a wire or cord pull loop extending through the outermost portion thereof to facilitate removal.

Similarly the outer pin member 28 can include an outer pin bracket member 29 in the form of a wire frame or cord which facilitates removal of the outer pin member 28 from the outer pin aperture means 24 whenever desired. Removal or replacement of the outer pin member 28 relative to the outer pin aperture means 24 is certainly necessary to allow movement of the jib member between the retracted position and the extended position. To prevent loss of the inner pin member 22 it can include an inner pin bracket member 27 such as a wire or cord pull loop extending through the outermost portion thereof to minimize misplacement thereof and to facilitate pin removal.

While particular embodiments of this invention have been shown in the drawings and described above, it will be apparent that many changes may be made in the form, arrangement and positioning of the various elements of the combination. In consideration thereof, it should be understood that preferred embodiment of this invention disclosed herein are intended to be illustrative only and not intended to limit the scope of the invention.

We claim:

1. A configurable hook lift jib apparatus comprising:
    an L-shaped frame (10) including an inner frame leg (12) and an outer frame leg (14) attached to the inner frame leg for movement with the inner frame leg, the outer frame leg having an inner pin aperture (22) and an outer pin aperture (24) spaced axially from the inner pin aperture;
    a jib member (30) including an inner jib section (32) and an outer jib section (34), the inner jib section including an axially elongated slot (37) having an inner slot end (38) and an outer slot end (39) spaced axially from the inner slot end, the outer jib section having a jib hook (36);
    an inner pin member (26) received by the inner pin aperture and the slot; and
    an outer pin member (28) removably receivable by the outer pin aperture and the slot;
    wherein the hook lift jib apparatus is configurable in a fixed operating configuration, wherein the inner pin member engages the inner slot end and the outer pin member engages the outer slot end such that axially directed movement of the jib member relative to the outer frame leg is prevented and the jib member is fixed in an extended position; and
    wherein the hook lift jib apparatus is further configurable in a floating operating configuration by removing the outer pin member from the outer pin aperture and the slot, wherein axially directed movement of the jib member relative to the outer frame leg is permitted between a retracted position in which the inner pin member engages the outer slot end and the extended position in which the inner pin member engages the inner slot end to keep the jib member connected to the outer frame leg.

2. The configurable hook lift jib apparatus as defined in claim 1, further comprising a spring (52) arranged to bias the jib member toward the extended position.

3. The configurable hook lift jib apparatus as defined in claim 1, further comprising an extensible member (60) connected to the inner frame leg (12), wherein:
    the apparatus is configurable in the fixed configuration such that the jib member is in the extended position to hook a grip bar of a first container at a first height when the apparatus is in a loading position and the extensible member is set to a given length, whereby the jib member remains in the extended position when the apparatus is moved to a resting hooked position; and
    the apparatus is configurable in the floating configuration to hook another grip bar of a second container at a second height less than the first height when the apparatus is in the loading position and the extensible member is set to the given length, whereby the jib member moves automatically from the extended position to the retracted position when the apparatus is moved to a resting hooked position;
    whereby the extensible member (60) is kept at the given length for loading both the first container and the second container to provide a mechanical advantage when loading the second container.

\* \* \* \* \*